United States Patent [19]

Hawman et al.

[11] Patent Number: 5,429,135
[45] Date of Patent: Jul. 4, 1995

[54] DETERMINING THE DEPTH OF AN ORGAN WHICH IS THE SUBJECT OF A NUCLEAR MEDICINE STUDY USING ONLY PLANAR IMAGE DATA

[75] Inventors: Peggy C. Hawman, Schaumburg; Jianzhong Qian, Hoffman Estates, both of Ill.

[73] Assignee: Siemens Medical Systems, Inc., Iselin, N.J.

[21] Appl. No.: 226,233

[22] Filed: Apr. 11, 1994

Related U.S. Application Data

[63] Continuation of Ser. No. 143,395, Oct. 26, 1993, abandoned, which is a continuation of Ser. No. 34,000, Mar. 19, 1993, abandoned, which is a continuation of Ser. No. 860,835, Mar. 31, 1992, abandoned, which is a continuation-in-part of Ser. No. 848,769, Mar. 10, 1992, abandoned.

[51] Int. Cl.$^6$ ............................................. A61B 6/00
[52] U.S. Cl. ........................... 128/659; 128/653.1; 250/363.02; 250/363.1; 250/369
[58] Field of Search .................. 128/659, 653.1, 774; 378/62, 162–164; 250/363.1, 363.02, 369

[56] References Cited

U.S. PATENT DOCUMENTS

| | | | |
|---|---|---|---|
| 3,852,598 | 12/1974 | Larsson | 250/363.02 |
| 3,979,594 | 9/1976 | Anger | 250/369 |
| 4,506,676 | 3/1985 | Duska | 128/653.001 |
| 4,583,538 | 4/1986 | Onik et al. | 128/653.001 |
| 4,692,937 | 9/1987 | Sashin et al. | 378/62 |
| 4,823,017 | 4/1989 | Hsieh | 250/363.1 |
| 5,036,463 | 7/1991 | Abela et al. | 364/413.13 |
| 5,188,111 | 2/1993 | Yates et al. | 128/662.06 |

FOREIGN PATENT DOCUMENTS

0389968  3/1990  European Pat. Off. .
4-90076  3/1992  Japan .

OTHER PUBLICATIONS

Green et al., Journal Nuclear medicine, vol. 16, No. 1, Jan. 1975, pp. 95–98.
Toohey et al., Proceedings of an International Seminar on Diagnosis and Treatment of Radionuclides, Vienna, Austria, Dec. 8–12, 1925, pp. 277–284.
Svernsdottir et al., Journal of Nuclear Medicine, vol. 18, No. 2 Feb. 1977, pp. 168–173.
Charkes et al., Tomographic Imaging in Medicine, chapter 17, 1972, pp. 186–195.
Cahill & Knowles, Software reliability and algorithm validation for medical imaging, Medical Physics, vol. 12, No. 5, pp. 575–580 (Oct. 1985).
Proceedings of the 1986 IEEE International Conference, pp. 211–215 (Oct. 14–17, 1986), Boyd & Stein.
Optical Engineering, vol. 20, No. 5, pp. 719–725 (Oct. 1981), Digital boundary detection techniques for the analysis of gated cardiac scintigra Hawman.
Proceedings of the IEEE Engineering in Medicine and Biology Society (Nov. 9–12, 1989), pp. 578–579, Boire, Cauvin, Maublant, & Veyre, Automatic Alignment of Thallium-201 Myocardial Tomographic Views.
Computers in Cardiology, (Sep. 12–15, 1987), pp. 191–194, Sitomer, Sanz, Anselmo, Simon & LeFree, Computer-Aided Gantry Positioning for Improved.
IEEE Transactions, vo. 7, No. 3, pp. 246–259 (May 1985), A knowledge Based System for Analysis of Gated Blood Pool Studies, Niemann, Bunke, Hofmann, Sagerer, Wolf and Feistel.

*Primary Examiner*—Lee S. Cohen
*Assistant Examiner*—Brian L. Casler
*Attorney, Agent, or Firm*—Mark H. Jay

[57] ABSTRACT

Two planar nuclear medicine images of a target organ are acquired using a focussing collimator at two different heights. An anatomic landmark associated with the target organ is computer-identified in each of the images, and the depth of the target organ is determined geometrically using the differences in size between the images of the identified landmark and the differences in height.

2 Claims, 3 Drawing Sheets

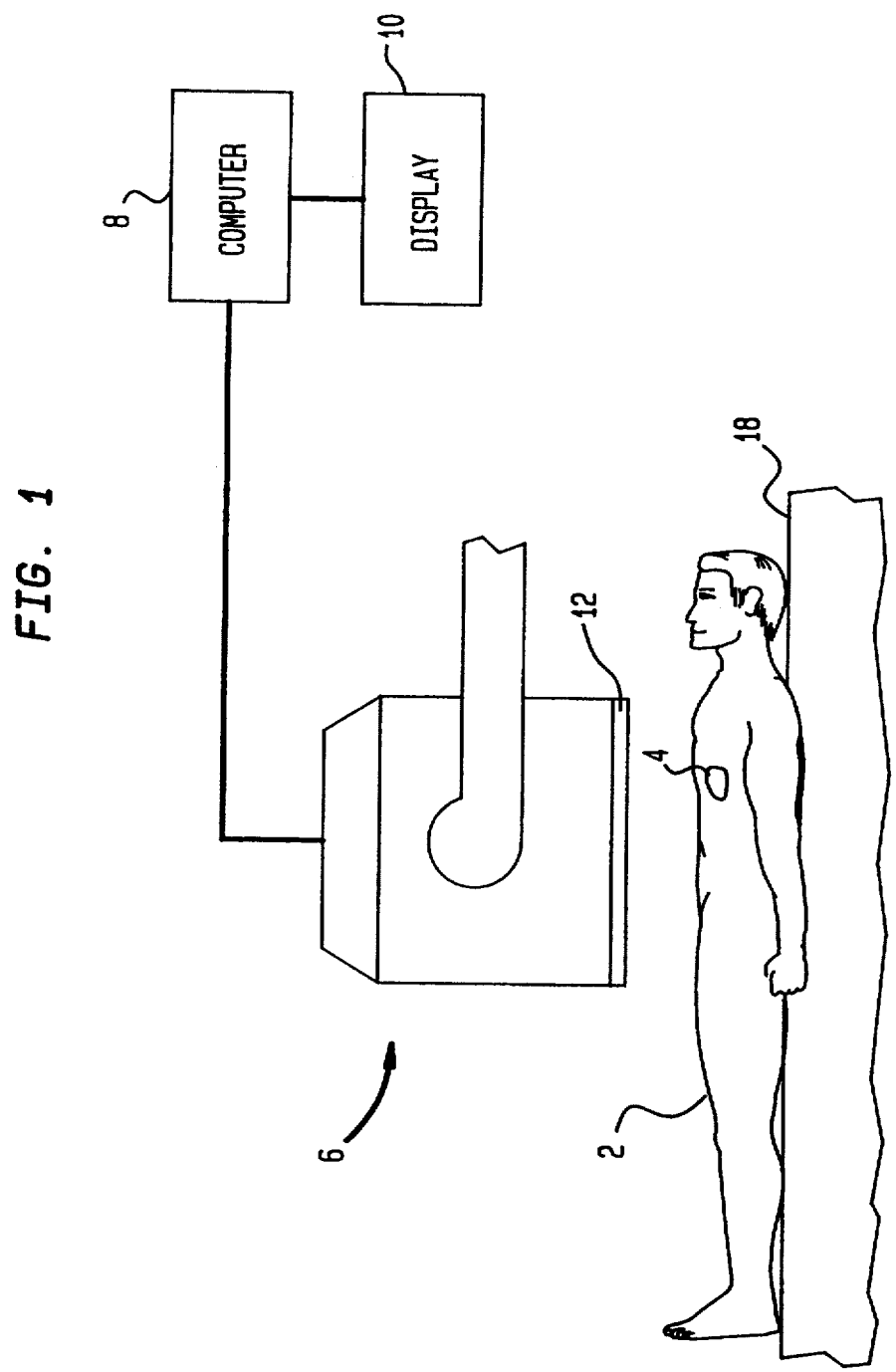

DETERMINING THE DEPTH OF AN ORGAN WHICH IS THE SUBJECT OF A NUCLEAR MEDICINE STUDY USING ONLY PLANAR IMAGE DATA

CROSS-REFERENCE TO RELATED APPLICATION

This is a continuation of application Ser. No. 08/143,395, filed Oct. 26, 1993 now abandoned, which is a continuation of application Ser. No. 08/034,000 filed Mar. 19, 1993, now abandoned, which is a continuation of application Ser. No. 07/860,835 filed Mar. 31, 1992, now abandoned, which is a continuation-in-part of commonly-owned application of Qian Ser. No. 07/848,769 filed pursant to 37 CFR §1.10 on Mar. 10, 1992, abandoned. The entire disclosure of this application, including the drawings, is hereby incorporated by reference as if fully set forth.

BACKGROUND OF THE INVENTION

The invention relates to nuclear medicine, and more particularly relates to nuclear medicine studies of patient organs, such as the heart. In its most immediate sense, the invention relates to determination of the depth of, e.g., the patient's heart within the body.

It is advantageous for a diagnostician to know the depth of an organ which is the subject of a nuclear medicine study. For example, in nuclear medicine studies of renal function, physicians evaluate renal function by conducting a planar image study and comparing uptake of radioisotopes with results that are tabulated by body size and depth of the kidney within the patient.

Such depth information cannot easily be determined from planar nuclear medicine image data. If such depth information is to be obtained using SPECT data, it is necessary to conduct a second study, and SPECT studies are time-consuming and expensive.

It would be advantageous to be able to obtain organ depth information from planar nuclear medicine image data, without the need to conduct an additional SPECT study.

Accordingly, one object of the invention is to permit organ depth information to be obtained from planar nuclear medicine image data.

Still a further object is, in general, to improve on known methods and apparatus in nuclear medicine.

In accordance with the present invention, a planar image of the organ of interest is acquired, using a focussing collimator, at two known and different heights. The result of this is two images which differ only in the degree of magnification. The method and apparatus disclosed in the above-referenced parent application is then used to automatically determine, in each of the images, an anatomic landmark related to the organ of interest. Since the focal length of the collimator and the heights of the collimator are known, the difference between the size of the landmark in the two images permits the depth of the organ to be determined using simple geometrical relationships.

BRIEF DESCRIPTION OF THE DRAWINGS

The invention will be better understood with reference to the following illustrative and non-limiting drawings, in which:

FIG. 1 is a schematic diagram of a scintillation camera system in accordance with the preferred embodiment of the invention;

DETAILED DESCRIPTION OF PREFERRED EMBODIMENTS

Figure 2A:
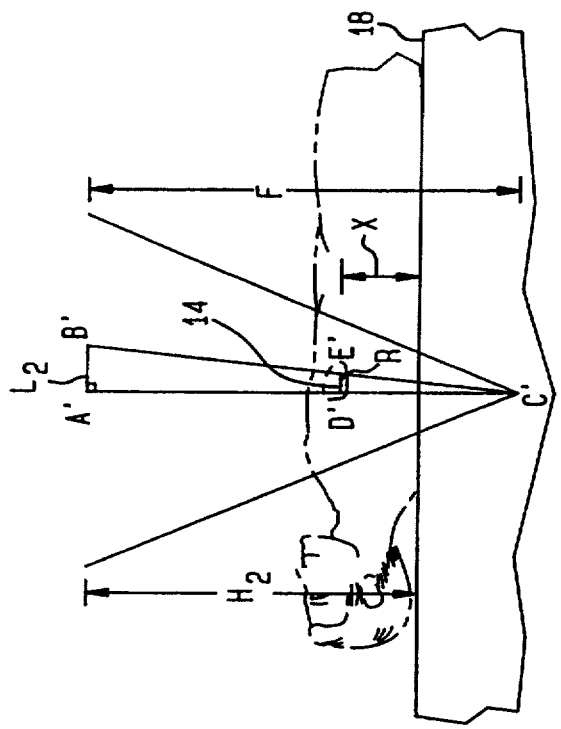
FIGS. 2A and 2B show the geometrical relationships upon which the preferred embodiment of the invention relies.

For illustrative purposes, the preferred embodiment is explained with reference to a cardiac study even though such studies are usually carried out using SPECT. This explanation has been chosen because it utilizes the specific disclosure of the above-referenced parent application, but the invention applies equally well to other types of studies.

As is shown in FIG. 1, a nuclear medicine study is conducted upon a patient 2. In such a study, a radioisotope is administered to the patient 2 and the a target organ such as the heart 4 of the patient 2 is imaged using a scintillation camera generally indicated by reference numeral 6. A number of frames of planar images collected by the camera 6 is routed to a computer 8, and the planar image itself may be displayed upon a display 10.

It can be seen that the scintillation camera 6 includes a focussing collimator generally indicated by reference numeral 12. The focussing collimator 12 in the illustrated instance is a so-called "fan-beam" collimator with focal length F which magnifies the image in one direction only, but this is not a part of the invention. The focussing collimator 12 may be a collimator which magnifies the image in more than one direction, and need not be of the fan-beam type.

Figure 2B:
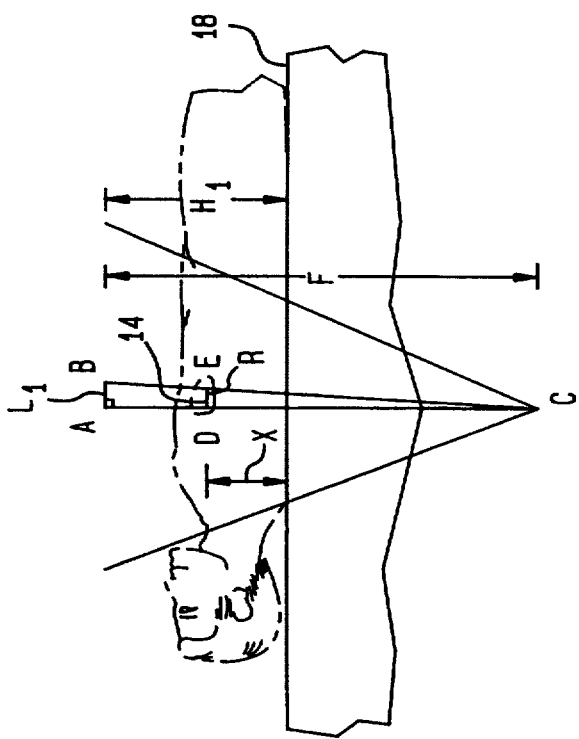
Figure 3:
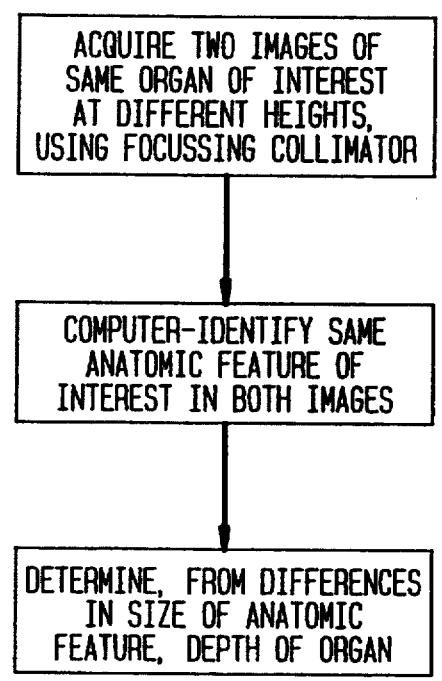
FIG. 3 is a flow chart in accordance with the preferred embodiment of the invention.

Turning now to FIGS. 2A and 2B, can be seen in FIG. 2B, when the patient 2 is closer to the focussing collimator 12, the image of the interventricular septum 14 of the heart 4 as projected upon the sensitive surface of the crystal (not shown) is smaller than when the patient 2 is further away from the sensitive surface of the crystal. The preferred embodiment of the invention utilizes this property to determine the depth X of the patient's heart 4 (X being defined as the distance between the center of the patient's heart 4 and the top of the patient table 18 upon which the patient 2 is placed.)

In accordance with the method and apparatus disclosed in the above-referenced parent application, it is possible to automatically determine anatomic landmarks of interest which relate to a patient's target organ. In accordance with the present invention, this method and apparatus is used to determine the intraventricular septum 14 of the patient's heart 4 as that septum 14 appears in each of the two images. (As is set forth in the referenced copending application, this determination can be made even with low-statistics and noisy image data. Thus, even though there may be insufficient data for the two images to be diagnostically useful in and of themselves, there will still be sufficient data to determine the intraventricular septum 14 of the heart 4.)

As can be seen from FIG. 2A, triangle ABC is a right triangle wherein side AB (the length L1 of the interventricular septum 14 in the image) forms the shortest side, and side CA has length F. Another triangle DEC is similar to triangle ABC, and by similar triangles:

$$L1/F = R/(F - H1 + X) \quad (1)$$

Similarly, as can be seen from FIG. 2B, triangle A'B'C' is a right triangle wherein side A'B' (the projection L2 of the interventricular septum 14 in the image) forms the shortest side, and side C'A' has length F. Another triangle D'E'C' is similar to triangle A'B'C', and by similar triangles:

$$L2/F = R/(F - H2 + X) \qquad (2)$$

Therefore, by (1), $RF = L1(F - H1 + X)$ and by (2), $RF = L2(F - H2 + X)$. Consequently $$X = ((L1H1 - L2H2)/(L1 - L2)) - F \qquad (3)$$

It is therefore possible to determine X from two images taken with the same focussing collimator at different heights. Because the method and apparatus disclosed in the above-reference parent application is quite robust, it takes only a few minutes to determine X.

Although the triangles ABC and A'B'C' are shown as right triangles for simplicity of illustration, the above relationships are still valid even when the feature of interest is not located at the center of the field of view, and triangles ABC and A'B'C' are therefore not right triangles.

Although a preferred embodiment has been described above, the scope of the invention is limited only by the following claims:

We claim:

1. A method of determining the depth of a target organ within a patient, comprising the following steps:

acquiring a first nuclear medicine image of the target organ using a focussing collimator at a first predetermined height;

acquiring a second nuclear medicine image of the target organ using the same collimator at a second predetermined height;

computer-identifying an anatomical landmark associated with the target organ as said landmark appears in the first nuclear medicine image;

computer-identifying the same anatomical landmark associated with the target organ as said landmark appears in the second nuclear medicine image; and determining, from differences in size between said identified landmarks and said heights, the depth of the target organ within the patient.

2. Apparatus for determining the depth of a target organ within a patient, comprising the following:

scintillation camera means for acquiring and storing a first nuclear medicine image of the target organ using a focussing collimator at a first predetermined height and acquiring and storing a second nuclear medicine image of the target organ using the same focussing collimator at a second predetermined height; and computer means for identifying an anatomical landmark associated with the target organ as said landmark appears in the first nuclear medicine image, for identifying the same anatomical landmark associated with the target organ as said landmark appears in the second nuclear medicine image and for determining, from differences in size between said identified landmarks and said heights, the depth of the target organ within the patient.

* * * * *